Nov. 6, 1928.

J. P. ERICH 1,690,534

SELF FLUXING SOLDER AND METHOD OF MAKING SAME

Filed Dec. 3, 1926

Inventor

John P. Erich,

By *Cushman, Bryant & Darby*
Attorneys

Patented Nov. 6, 1928.

1,690,534

UNITED STATES PATENT OFFICE.

JOHN PEABODY ERICH, OF CHICAGO, ILLINOIS, ASSIGNOR TO CHICAGO SOLDER COMPANY, OF CHICAGO, ILLINOIS, A CORPORATION OF ILLINOIS.

SELF-FLUXING SOLDER AND METHOD OF MAKING SAME.

Application filed December 3, 1926. Serial No. 152,398.

This invention relates to an improved end or terminal closure for self-fluxing wire solder and method of producing the same. This self-fluxing wire solder is constructed in the form of a tube or shell which may be oval, flat, or round in its cross section and containing a suitable flux.

The solder is supplied in varying sizes and lengths, upon spools of different poundage capacity or loosely coiled in suitable boxes, cartons, or cans, or in short lengths or sticks loosely packed in suitable boxes, cartons, or cans, or in short lengths or coils for sample or display purposes.

The terminals of the individual lengths of solder are suitably compressed or collapsed to prevent loss of the flux, and intermediate portions are suitably compressed to provide a longitudinal series of isolated cells or compartments containing the flux.

The object of the invention is to provide an improved form of seal or closure which will effectively prevent leakage of the flux from the ends of the tube or shell and exclude air from the flux core, thereby preventing detrimental effects of air upon the flux.

It has been found that where the ends or sealing portions are simply compressed or flattened for a short distance, there is leakage of the flux and an admission of air to the flux core, notwithstanding the fact that very high pressure is employed when flattening the sealing portions or terminals.

The present invention consists broadly in suitably collapsing and distorting terminal or sealing portions, preferably along lines extending transversely of the shell. This distortion has been found to be most effective when it takes the form of spaced parallel transverse lines of compression similar to corrugations. By thus collapsing and corrugating the flattened terminals of the shell, there is produced a very effective seal. The terminals of the shell are flattened and corrugated under relatively high compression so that a metal-to-metal contact, and substantially a welding by compression, of the ductile metal of the tube is brought about, as distinguished from the punching or pressing the tube along its length against the flux to form flux cells. By thus treating the terminals so as to compress the metal into practically a state of homogeneity throughout, a complete seal of the ends of the tube is secured through which it is impossible for the flux to escape or air to enter into the flux core.

Referring to the accompanying drawings, where the invention is illustrated:

Figure 1:
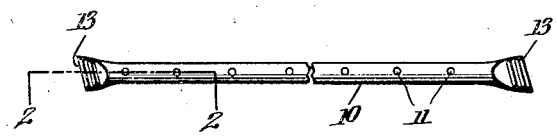
Figure 1 is an elevational view showing the terminals of a length of solder provided with the improved seal of the present invention.
Figure 2:
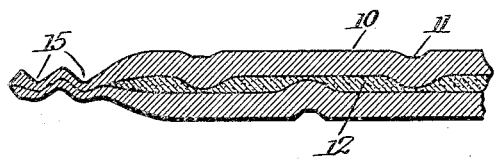
Figure 2 is a longitudinal section on the line 2—2 of Figure 1.
Figure 3:
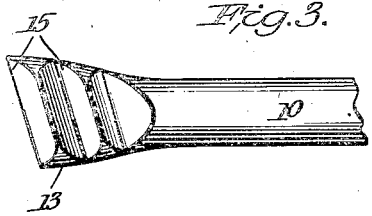
Figure 3 is an enlarged perspective.

Referring to the drawings for a more detailed description, 10 indicates a length of wire-like solder which is of tubular construction, and has indentations 11 at suitable intervals to provide compartments or cells 12 for the flux (Figure 2). This construction is broadly old, and constitutes no part of the present invention.

Heretofore, the ends 13 of the lengths of solder have been sealed by simply flattening the shell 10 for a suitable distance, but it has been found that although extremely high pressures are employed, the mere flattening does not produce a closure which will effectively prevent leakage of the flux and exclude air from the flux core.

The present invention consists in transversely distorting, as well as collapsing the shell or walls of terminal portions, preferably by corrugating the same along transverse lines 15, which, it will be observed, are substantially parallel and spaced apart. By thus collapsing and corrugating the terminal section transversely of the line of flow of the flux, there is produced a tortuous path upon the interior of the collapsed portion which the flux must follow in order to escape (Figure 2).

In other words, the corrugating or crimping of the terminal causes the line of contact of the compressed walls, and the longitudinal line of the flux core to be deflected or corrugated transversely to the length of the solder tube. It has been found that compression of self-fluxing solder wire by means of ordinary pliers does not cause such corrugation or deflection of the line of contact of the opposed walls or cause deflection of the longitudinal line of the flux core. Moreover, the sharp bends at the transverse line of contact 15 enable the production of very tight seals between the enclosing walls of the shell. One or more of these corrugations may be deemed sufficient at each terminal portion so collapsed. As pointed out in the general statement of the invention, the walls of the terminal portions when flattened and corrugated along the lines 15, are brought into intimate contact, with metal against metal, and will, effectually prevent the escape of the flux, as distinguished from that interlocking of the walls of the tube with the flux by means of the indentations 11. The terminal portions 13 are flattened and corrugated preferably without any flux between them so as to insure a complete sealing thereof but in case of flux being between these walls, it is squeezed out of the compressed portion by the compressing action of flattening the tube.

This distortion may be accomplished in any suitable way, as by a hand tool having properly matched corrugated jaws.

It will be understood that this method of sealing the flux in a solder shell is applicable to any type of cored solder, and, accordingly, the invention is not to be limited to use with self-fluxing solder of the precise character illustrated and described.

I claim:

1. The method of preparing a flux cored solder tube, which consists in sealing said tube by compressing the walls of a section of the tube into metal-to-metal contact, and grooving such compressed section to deflect the longitudinal line of the flux core and the line of contact of said compressed walls.

2. The method of preparing a flux cored solder tube which consists in sealing said tube by compressing the opposed walls of an end of the tube into metal-to-metal contact, and distorting such compressed section by imposing corrugations on it disposed transversely to the length of the tube to corrugate the longitudinal line of the flux core and the line of contact of the opposed compressed walls.

3. A tube of solder containing a flux core, said tube having its walls compressed into metal to metal contact with each other, said compressed walls being grooved to deflect the longitudinal line of the flux core and the line of contact of the compressed walls.

4. A tube of solder containing a flux core, said tube having its opposed walls compressed into metal-to-metal contact with each other and distorted substantially transversely to the length of the tube to corrugate the line on which the opposed compressed walls of the tube are in contact and to corrugate the longitudinal line of the flux core.

In testimony whereof I have hereunto set my hand.

JOHN PEABODY ERICH.